(12) United States Patent
Grosvenor et al.

(10) Patent No.: US 8,264,574 B2
(45) Date of Patent: Sep. 11, 2012

(54) ELECTRONIC IMAGE CAPTURE WITH REDUCED NOISE

(76) Inventors: David Grosvenor, Bristol (GB); Andrew Hunter, Bristol (GB)

( * ) Notice: Subject to any disclaimer, the term of this patent is extended or adjusted under 35 U.S.C. 154(b) by 371 days.

(21) Appl. No.: 12/375,805

(22) PCT Filed: Jul. 27, 2007

(86) PCT No.: PCT/EP2007/057789
§ 371 (c)(1), (2), (4) Date: May 5, 2009

(87) PCT Pub. No.: WO2008/015176
PCT Pub. Date: Feb. 7, 2008

(65) Prior Publication Data
US 2009/0309998 A1 Dec. 17, 2009

(30) Foreign Application Priority Data
Jul. 31, 2006 (GB) .................. 0615152.6

(51) Int. Cl.
*H04N 5/217* (2011.01)
*H04N 9/64* (2006.01)

(52) U.S. Cl. ........................ 348/241; 348/243
(58) Field of Classification Search .................. 348/241, 348/243, 218.1
See application file for complete search history.

(56) References Cited

U.S. PATENT DOCUMENTS

| | | | |
|---|---|---|---|
| 6,219,097 B1 | 4/2001 | Kamishima et al. | |
| 7,095,434 B1 * | 8/2006 | Ikeda ......................... | 348/219.1 |
| 7,595,823 B2 * | 9/2009 | Yen et al. ...................... | 348/239 |
| 2002/0036697 A1 | 3/2002 | Mori et al. | |
| 2002/0186305 A1 | 12/2002 | Atkin | |
| 2004/0207734 A1 | 10/2004 | Horiuchi | |
| 2005/0018253 A1 | 1/2005 | Takeda | |
| 2006/0133688 A1 | 6/2006 | Kang et al. | |
| 2008/0143841 A1 * | 6/2008 | Tico et al. ................ | 348/208.99 |

FOREIGN PATENT DOCUMENTS

EP 1225756 A 7/2002
WO PCT/EP2007/057789 7/2007

OTHER PUBLICATIONS

Yang Ni et al., "Histogram-Equalization-Based Adaptive Image Sensor for Real-Time Vision", IEEE Journal of Solid-State Circuits, vol. 32, No. 7, Jul. 1997, XP011060516.

* cited by examiner

*Primary Examiner* — Jordan Schwartz

(57) ABSTRACT

An electronic image capture system for capturing a reduced noise image of a scene includes a detector array and an image processing apparatus. The detector array provides to the image processing apparatus data representing at least one image of a scene detected by the array. The image processing apparatus holds a noise model that characterizes the noise performance of the image capture system. Based on the image data and the noise model the image processing apparatus identifies one or more portions of the scene that are predicted to contribute disproportionately to visible noise in an image formed from said image data. Based on the identified portions of the scene and the noise model, the image processing apparatus determines an exposure pattern for the image capture system that is predicted to produce multiple exposures of the scene that are combinable to produce an image with a minimal predicted noise.

27 Claims, 4 Drawing Sheets

ELECTRONIC IMAGE CAPTURE WITH REDUCED NOISE

The present application claims priority to PCT application number PCT/EP2007/057789, having an international filing date of Jul. 27, 2007, which claims priority to patent application serial number GB0615152.6, filed Jul. 31, 2006, both of which are incorporated by reference in their entireties.

BACKGROUND a. Field of the Invention

The present invention relates to an electronic image capture system for capturing an electronic image having reduced noise, and a method for capturing an electronic image having reduced noise, for example from a digital camera device.

b. Related Art

There is a demand for and a trend towards miniaturisation of many types of image capture device. For example, digital cameras may be integrated in cell phones, which are ever more compact. Such a camera will need to have a small diameter lens compared with a lens in a more conventional dedicated hand-held digital camera. For this reason, and also for reasons of reduced cost, the detector arrays used in cell phones and other miniaturised digital cameras have become smaller. At the same time, users expect a larger number of image capture pixel elements for increased image definition, with the result that the size of the pixel elements is greatly reduced.

Smaller solid state pixel elements, for example of the CCD or CMOS type, have a decreased capacity for holding electric charge. Although the inherent efficiency of a small pixel element may be comparable to that of a larger element, a reduced detector "well size" will limit the total number of photons each pixel element can sense. The detector shot noise varies with the square root of the captured image intensity, with the best signal to noise ratio normally being in regions having the greatest image intensity. Thus, smaller arrays having smaller pixel elements, and lower maximum signals, are usually noisier than detector arrays having larger size pixel elements. Other more constant sources of noise which do not depend on image intensity, particularly readout noise, will add to the shot noise, and will normally contribute a larger proportion of the total signal in an array with lower maximum signal.

As a result, there is an increased need for better noise reduction in many electronic image capture devices, without unduly adding to the hardware cost of such devices or worsening other image capture performance metrics, for example the maximum number of frames per second, or the lifetime of portable power sources.

A further problem arises in that the increased noise due to shrinking pixels will limit the use of tone-mapping to improve visual image quality, since tone mapping requires gain to be applied in some parts of the signal range and this will make noise even more visible.

The relative strength of noise in an electronic image will normally be highest in dimly lit areas of a scene, where the number of photons captured will be lowest for a given exposure time, aperture restriction or electronic gain setting (for convenience, referred to hereinafter collectively and individually simply as "exposure"). The exposure will need to be such that the brightest parts of the image are within the saturation limits of the pixel elements, with the result that dimly lit areas at the same exposure may be well below saturation, and have a correspondingly lower signal-to-noise ratio (S/N).

However, from a perceptual point of view, noise in dimly lit portions of a scene may be less visible, or less important, than noise in brighter portions if the dim areas are not of interest to a viewer of the image. In considering the importance of noise reduction in an electronic image, it is therefore not sufficient to consider only the effect of noise in dimly lit areas of a scene.

It is an object of the invention to provide a more convenient apparatus and method for capturing an electronic image with reduced visible noise.

SUMMARY OF THE INVENTION

According to the invention, there is provided an electronic image capture system for capturing a reduced noise image of a scene, comprising a detector array and an image processing apparatus, the detector array being arranged to provide to the image processing apparatus data representing at least one image of a scene detected by the array, and the image processing apparatus holding a noise model that substantially characterises the noise performance of the image capture system, wherein the image processing apparatus is arranged to:
  identify, using the image data and the noise model, one or more portions of the scene that would contribute disproportionately to visible noise in an image formed from said image data; and
  select an exposure pattern on the basis that said selected exposure pattern will reduce the contribution to the visible noise from said portions when exposures from said selected exposure pattern are combined to form the reduced noise image.

The reduced noise image may be a single image, for example taken by a still camera, or may be a single image that forms part of a video sequence from a video capture system.

The noise model may further characterise the noise performance of image processing by including a contribution from the process of combining of the selected exposure pattern.

The image processing apparatus may be arranged to use the noise model and said image data to estimate visible noise for at least part of an image derived from a single exposure or combination of exposures, and to use this noise estimate to identify the above-mentioned portions of the scene.

The image processing apparatus may be arranged to use the noise model and the image data to identify one or more suitable exposures to reduce the contribution to visible noise.

The identified portions of the scene may be spatial portions defined at least partially on the basis of their spatial locations in the image data.

The identified portions of the scene may be tonal portions defined at least partially on the basis of their tonal properties in the image data.

The image processing apparatus may be arranged to apply a spatial weighting so that image data from selected spatial regions of the scene is relatively more important than image data from other spatial regions. In this case, the image processing apparatus may also be arranged to identify one or more specific features in a detected image and to increase or reduce the weighting of image data originating from those features.

In a preferred embodiment of the invention, the weightings depend upon the local continuity of the scene such that strong textures derive low weights and smooth tones or gradients derive high weights.

Additionally or alternatively, the spatial weightings may be increased or reduced on the basis of face recognition rules applied by the image processing apparatus.

Additionally or alternatively, the spatial weightings may be increased or reduced on the basis of visual saliency rules applied by the image processing apparatus.

Additionally or alternatively, the spatial weightings may be increased or reduced on the basis of image processing rules applied by the image processing apparatus. In this case, the image processing rules may include one or more of tone mapping rules, colour processing rules, noise reduction rules, vignetting correction rules, and image sharpening rules.

In a preferred embodiment of the invention, the image processing apparatus may be arranged to generate from the image data a tonal importance mapping and then to use the noise model to identify from the tonal importance mapping one or more of said portions of disproportionate visible noise.

The tonal importance mapping is a mapping from a scene tone to an importance value that indicates the visibility of image noise in portions of the scene having that tonal value. The term "tone" may refer to any measured or computed value that is indicative of scene radiance in the parts of the spectrum sensed by one or each colour channel of the detector. In relation to colour data and mosaic data, detected or interpolated colour values at each pixel position may be used to derive a separate map of scene tones for each colour channel.

The tonal importance mapping associates a higher or lower importance value with a scene tone according to the number of pixels and/or spatial weightings of pixels in the image data having a corresponding image tone. In the case of colour image data, the count of pixels having a particular tonal value may be summed across each colour channel. Different spatial weightings may be applied to the pixels in each colour channel so that the contribution to the tonal importance mapping from each channel may be unequal, and may vary according to the colour of the corresponding points of the scene.

The processor may be arranged to identify one or more features in a detected image for which noise reduction is desired. The tonal importance mapping may then be weighted so that image data originating from said feature(s) is preferentially used to select one of a plurality of possible multiple exposure patterns.

The processor may be arranged to apply to the image data one or more pre-determined rules to select in the detected image one or more contiguous spatial regions each comprising a plurality of detector pixels for which it is desired to selectively reduce the noise contribution. The tonal importance mapping may then be weighted to enhance the importance of the contribution from this plurality of pixels in the calculation of noise.

Such spatial regions may be selected on the basis of the uniformity of the intensity and/or the uniformity of the colour of these spatial regions. For example, it may be desired to reduce the noise preferentially in regions of high uniformity where such noise may stand out, such as an area of blue sky. Conversely, in areas having a high texture or granularity, noise may be hidden or indistinguishable from the detail in the image, in which case it will not be necessary to reduce the noise.

The spatial regions may, alternatively or additionally, be selected on the basis of face recognition rules applied by the processor.

The image data used to form the tonal importance mapping may therefore be weighted to give extra prominence to those intensities for which noise reduction is most desirable.

The exposure pattern may be a pattern of temporally sequential exposures, or a pattern of temporally overlapping exposures, or a combination of these.

The processor may be constrained to select the exposure pattern within a calculated constraint, referred to herein as a cost metric. The cost metric may be formed from any practical constraints that prevent any arbitrary pattern of exposures from being selected. For example, the cost metric may include a measure of total exposure time, or available electrical power, or available memory capacity, or the rate at which the electronic image capture system may capture images, or any combination of these factors.

When the cost metric includes a measure of available electrical power the system may, for example, capture fewer exposures when battery power is low.

Another way in which the selected exposure pattern may be constrained is that this may need to be completed within a variable time window. The time window may be determined by the type of scene being captured or by a capture mode of the electronic image capture apparatus, for example, an action setting, a low-light setting, or a portrait setting.

The variable time window may therefore be selected by the processor according to at least one of a plurality of pre-determined exposure criteria. Such exposure criteria may include a minimum and a maximum allowable total exposure time.

After the multiple exposures have been captured, the processor can combine these to produce image data having less noise than the image data used to generate the tonal importance mapping on which the noise calculation was based.

Also according to the invention, there is provided a method of choosing multiple exposures for capturing an image of a scene with reduced noise, comprising the steps of:
a) providing to an image processing apparatus image data representative of a scene;
b) identifying one or more portions of the scene that would contribute disproportionately to the visible noise in an image formed from said image data; and
c) using said identification to choose an exposure pattern to reduce the contribution to said visible noise from said portions when exposures from said selected exposure pattern are combined to form the reduced noise image.

The invention further provides a method of capturing a reduced noise image of a scene using an electronic image capture system including an image processing apparatus, the method comprising the steps of providing to the image processing apparatus image data representing at least one monitored image, and using the image processing apparatus to:
i) generate from the image data a tonal importance mapping;
ii) use the tonal importance mapping to identify one or more portions of the scene that would contribute disproportionately to the noise present in an image derived from said image data;
iii) choose a multiple exposure pattern including at least one exposure to reduce the noise contribution from at least one of said portions; and
iv) use said desired multiple exposure pattern to capture multiple images of said scene and combine said multiple images to produce the reduced noise image.

Step ii) may comprise the steps of storing in the image processing apparatus a noise model that characterises the noise performance of the electronic image capture system, and then using the noise model to calculate from the intensity histogram the noise present in an image derived from said image data.

The tonal importance mapping in its simplest form will be an intensity histogram that gives a simple count of pixels having a particular intensity value, or falling within a band of intensity values, over a range of detected intensity values.

Usually, this will be between zero and a maximum detected intensity, which may a saturated intensity.

The image data used to form the intensity histogram may be spatially weighted so that the noise contribution from selected spatial regions of the detector array is relatively more important than from other spatial regions. For example, the intensity histogram may be formed from image data for which centrally located areas, or areas near corners of an image, are given a higher weighting or count in the histogram.

The selected exposure pattern may be arrived at by the processor after an optimisation routine in which the processor calculates a total noise level for a sequence of possible exposure patterns while seeking a local minimum in the calculated total noise.

When the electronic image capture system comprises a detector array, the method may comprise the steps of detecting at least one monitored image of a scene using the detector array, and producing from said monitored image(s) said image data.

Step ii) may comprise the steps of determining from the tonal importance mapping the visible noise present in an image formed from said image data, and then identifying one or more portions of the tonal importance mapping that contribute disproportionately to said visible noise.

Step iii) may comprise the steps of predicting the noise contribution from said portions that would be present at different exposures of said scene, and then selecting a desired multiple exposure pattern including at least one exposure to reduce the noise contribution from at least one of said portions.

The method may also comprise capturing multiple images of said scene and combining said multiple images to produce the reduced noise image.

The image formed from the selected multiple exposure pattern may be in the form of a composite image, in which different portions of the image or different image pixels will originate from different exposures, normally selecting the brightest non-saturated pixels from the available exposures, and scaling the pixel values according to the corresponding exposures to provide consistent illumination of the scene.

Alternatively, rather than select pixel values for the composite image from different exposures, it is possible to combine values from multiple exposures at each pixel position so as to further reduce the noise level in the composite image and to avoid abrupt steps in the noise level between adjacent pixel values. It is also preferred that known techniques are used to combine the multiple exposures so as to minimize any effects of subject or camera motion between the individual exposures.

The image may also be subject to other forms of post-processing such as retinex image processing or other forms of tone-mapping. The invention is also compatible with various known noise reduction techniques that may be applied to the captured composite image.

Optionally, the noise model may take into account the capabilities of such post processing and noise reduction.

A main constituent of the noise model will, however, be the inherent noise of the detector array, particularly shot noise, and any other significant sources of noise such as readout noise. The noise model may also characterise the noise performance of image processing performed in the processor. Such sources of noise can be characterised for a given arrangement of detector and processor in order to produce the noise model and so calibrate the electronic image capture system. In particular, the noise model may characterise the effect of image processing to combine multiple exposures to form the reduced noise image.

The processor may be arranged to locate one or more local maxima in the intensity histogram, the pre-determined criteria then including the location of the local maxima.

These can then be used in the selection of the desired exposure pattern.

BRIEF DESCRIPTION OF THE DRAWINGS

The invention will now be further described, by way of example only, and with reference to the accompanying drawings, in which.

DETAILED DESCRIPTION

Figure 1:
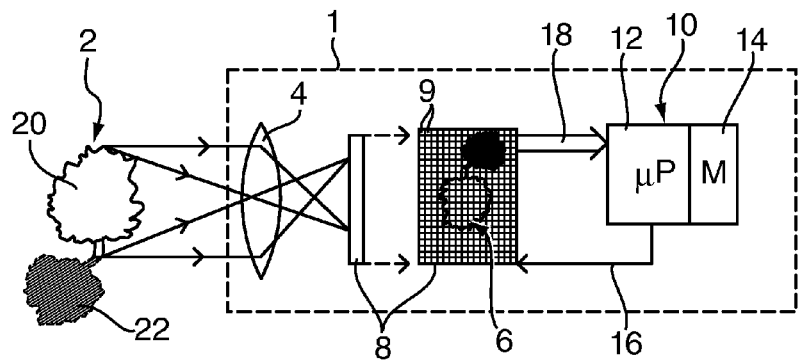
FIG. 1 is a schematic diagram showing an electronic image capture system according to the invention for capturing an image of a scene, comprising a detector array and an image processing apparatus.

FIG. 1 shows a schematic diagram showing an electronic image capture system 1 for capturing an image of a scene 2. The system 1 comprises an optical imaging system 4, arranged to project an image 6 of the scene 2 onto a rectangular detector array 8 formed of detector pixels 9 on a grid array.

The detector array 8 is operated under the control of an image processing apparatus 10 which comprises a processor 12 and a memory 14. The processor 12 sends command signals 16 to the detector array 8 and receives back image data 18 when an image is detected by the array 8.

The system 1 may, for example, be part of a hand held electronic camera device, or any other type of electronic imaging equipment. Not shown, for the sake of clarity, are ancillary electronics, connections and components that are commonly used with such systems, such as user input controls, power supplies, image outputs, displays, and the like.

In this example, the scene 2 includes a tree 20 that is casting a dark shadow 22 onto the ground.

Figure 2:
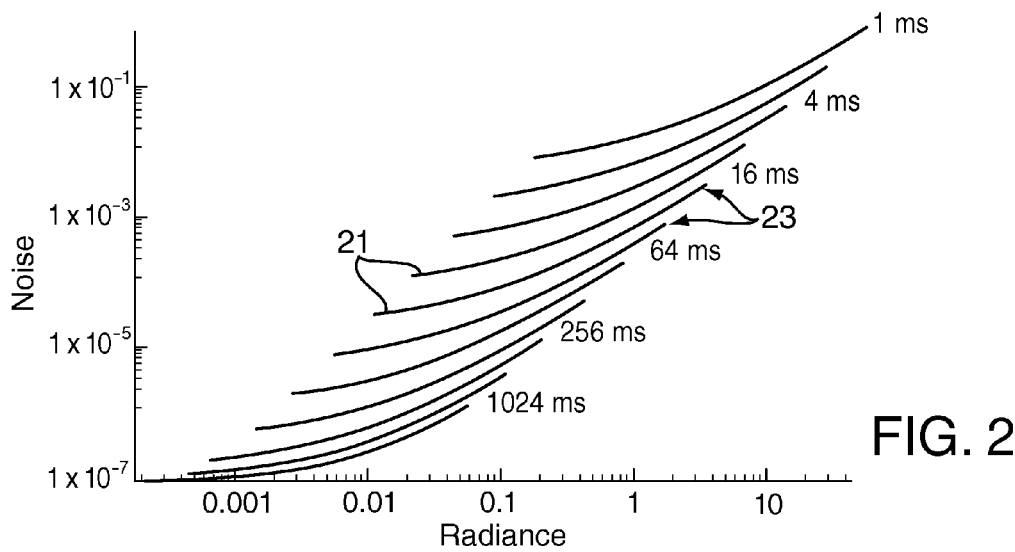
FIG. 2 is a log-log plot of the noise performance of the electronic image capture system of FIG. 1, showing noise plotted against scene radiance for a number of different exposure times.

FIG. 2 is a log-log plot illustrating the noise performance of the electronic image capture system 1, for the green channel only, over a range of possible exposure times 21, and against the scene radiance for the green part of the spectrum, which will depend on the image intensity on the green pixels of the detector array 8. The main component of the noise is shot noise in the detector array 8. Each exposure time 21 extends close to saturation 23 at higher radiances. Towards lower radiances for each exposure time 21, the noise performance degrades.

Figure 3:
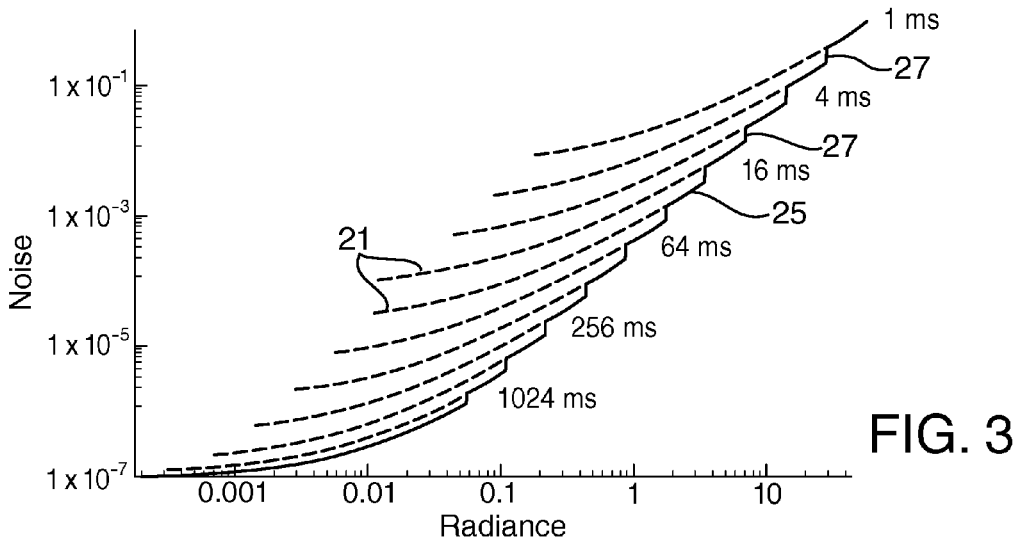
FIG. 3 is a log-log plot based on that of FIG. 2, illustrating noise to be used in a noise model characterising the ultimate noise performance of the electronic image capture system for those particular exposure times.

FIG. 3 illustrates the noise performance of an exposure making use of the multiple exposure pattern derived from FIG. 2, plotted as a log-log plot. This plot is used to illustrate a simplified noise model 25 characterising the ultimate noise performance of the electronic image capture system when the possible exposure times 21 are limited to those values illustrated, namely, 11 different exposures separated by powers of two between 1 ms and 1024 ms. The noise model 25 has the form of a noise ramp with distinct steps 27 at the saturation limits 23 of each exposure time 21. The noise model 25 is stored in the memory 14 as a calibration of the noise performance of the system 1 or can be derived from other stored calibration data in the memory 14.

In practice, an electronic imaging system 1 may have almost any number of different possible exposure times, the resolution of exposure steps being limited only by the clock cycle time of the detector array 8 or other controlling electronics. In principle, the noise performance could be improved arbitrarily by selecting an ever greater number of multiple exposures, but in practice, this is not feasible owing practical considerations such as the length of time it would take to complete a multiple exposure, memory limitations, and so on.

Figure 4:
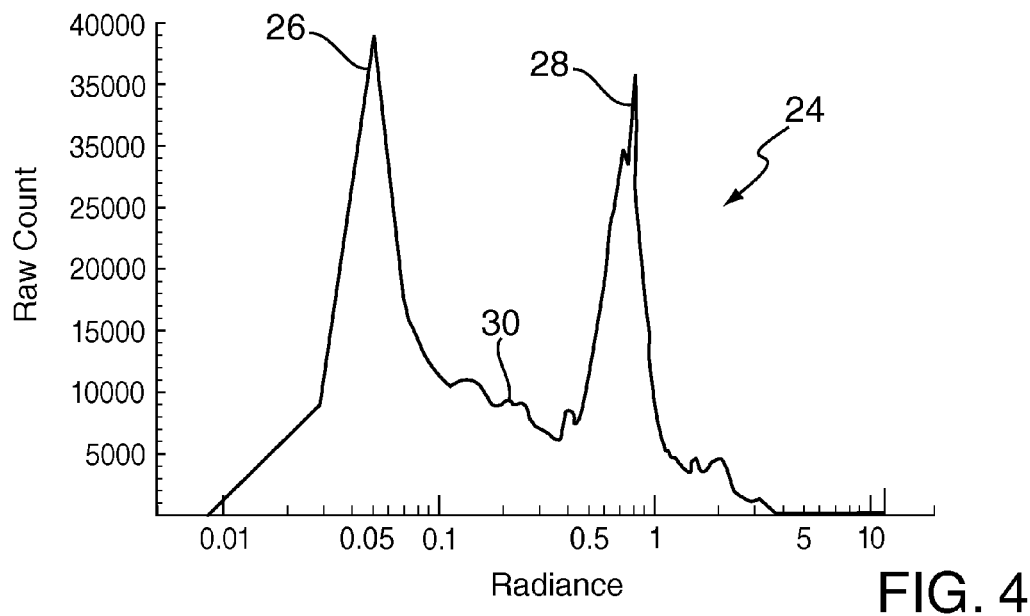
FIG. 4 shows one type of tonal importance mapping, which is here an intensity histogram of a raw detector array count against image radiance for the electronic image capture system when used to image the scene of FIG. 1.

FIG. 4 shows a scene radiance histogram 24 which is a type of unweighted tonal importance mapping. The scene radiance histogram illustrates a count of detector array pixels having intensities that correspond to each scene radiance for the electronic image capture system 1 when used to image the scene 2. The count will be related directly to the number of detected photons plus noise which in turn relates to the scene radiance. Other forms of tonal importance mapping are possible that provide an alternative mapping from a quantity generally indicative of the tonal levels of the scene to another quantity generally indicative of the significance of noise present in those tones. This first step involves generating the scene radiance histogram 24 from a preliminary or monitor image 6 at a desired exposure setting suitable for substantially the entire image.

The scene radiance histogram 24 of the image 6 is a histogram derived from a count of pixels having each of a range of intensity values. This histogram relates the number of pixels in an image at each different intensity value found in that image. For a 16-bit greyscale image there are 65536 different possible intensities, and so the histogram could represent 65536 numbers showing the distribution of pixels amongst those greyscale values. Histograms can also be taken of colour images. Histograms of the individual colour channels can be used separately or in combination, or a single colour channel can be treated as indicative of scene radiances.

Each of the pixels that represents an image stored inside the processor memory 14 has a pixel value which describes how bright that pixel is, and/or what colour it should be.

To represent colour images, separate red, green and blue components must be specified for each pixel (assuming an RGB colourspace), and so the pixel "value" is actually a vector of three numbers. Often the three different components are stored as three separate "greyscale" images known as colour planes (one for each of red, green and blue), which have to be recombined when displaying or processing.

In this example, the histogram 24 is just for the colour green and has one peak 26 at lower radiances corresponding to dark areas of the image, for example the shadow 22, and then a second peak 28 at higher radiances, for example the tree 20. In between is a minimum 30, which in this example is taken to be blue sky.

As shown in FIG. 4, the intensity histogram is a one-dimensional histogram in terms of detected image intensity. The one-dimension nature of the histogram simplifies further computation.

In general terms, the processor uses the noise model 25 to calculate from the intensity histogram 24 the noise that would be present in an image formed from the image data, and then uses one or more pre-determined criteria to identify one or more portions of the intensity histogram 24 that contribute disproportionately to the calculated noise present in said image data. The criteria here may be peak detection in the histogram.

The processor 10 then selects one of a plurality of possible multiple exposure patterns that selectively reduces the contribution to the calculated noise from these portions of the intensity histogram 24 when the electronic image capture system 1 is to be used to capture an image of the scene 2. The multiple exposures are then combined to form a noise reduced image.

Figure 5:
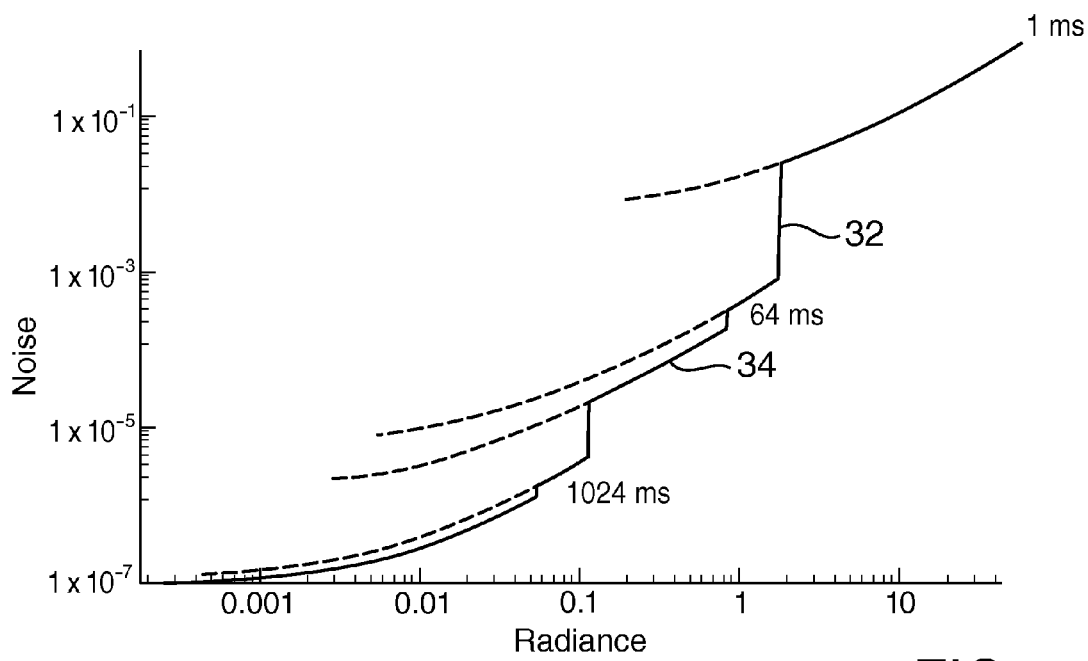
FIG. 5 shows a first selected exposure pattern for a composite captured image of the scene of FIG. 1, which reduces image noise in the composite image as compared with an image taken at a single exposure suitable for the entire image.

As shown by FIG. 5, noise steps 32 in a calculated noise performance 34 are positioned so that both peaks 26, 28 in the intensity histogram 24 coincide with noise levels near an optimal limit, while lower histogram counts do not.

An example of a more general method for scoring the performance of a particular pattern of exposures is as follows.

A metric or score for a pattern of exposures is given by the sum over all radiances of the importance of each radiance value divided by the noise, or a function of the noise, of the pattern at that radiance level.

By this scoring method, portions of the image having higher importance will be weighted more heavily, and patterns that give lower noise levels, especially in those areas of higher importance, will give higher scores.

The histogram count of pixels shown in FIG. 4 can in some circumstances be somewhat crude, because the context surrounding a pixel is often important in determining whether the noise associated with this radiance value is significant or noticeable.

Figure 6:
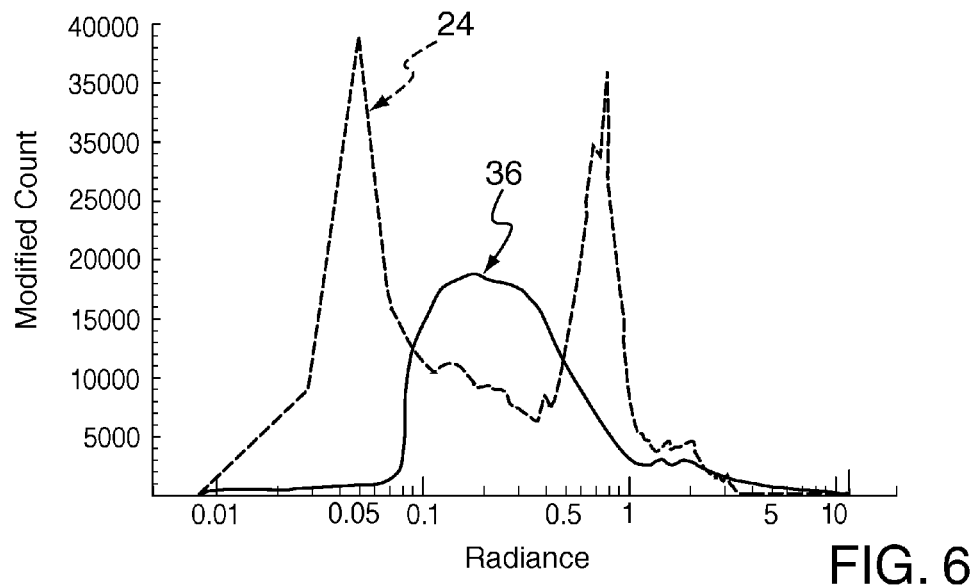
FIG. 6 is an intensity histogram based on that of FIG. 4 showing a detector array count modified according to the visual importance of different areas of the image on the detector array.
Figure 7:
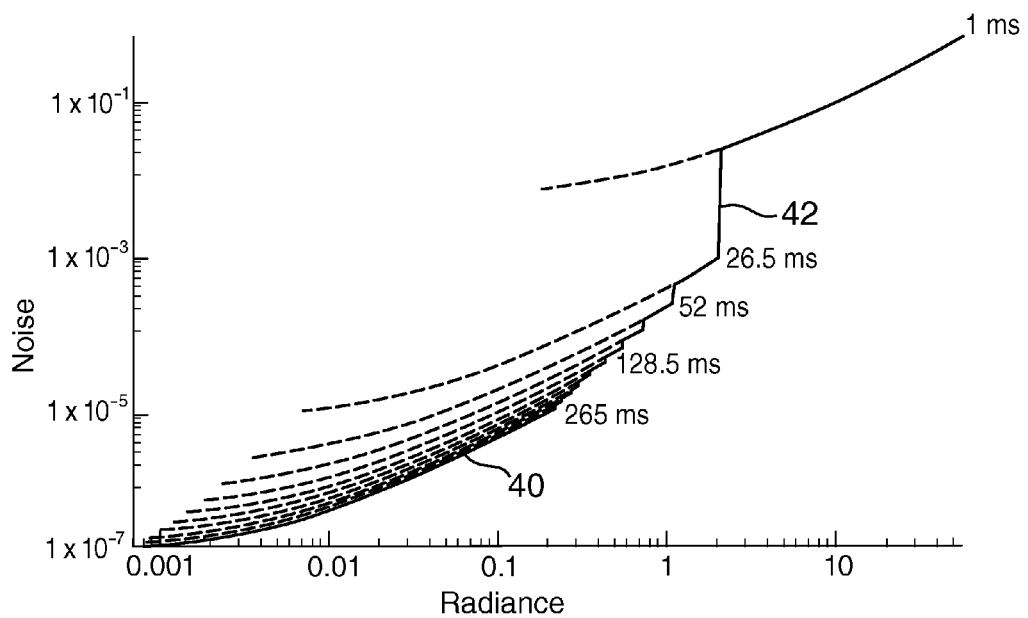
FIG. 7 shows a second selected exposure pattern for a composite captured image of the scene of FIG. 1, which further reduces image noise in the composite image for visually important areas of the captured image.

One type of region where noise can be most noticeable is a flat region or a smoothly varying region of the image, for example a large region of blue sky. The larger the area of this region the more important it is to reduce the noise. As shown by the modified intensity histogram, or tonal importance mapping 36 of FIG. 6, the processor 10 weights the radiance values in such a region to increase the importance compared to the value of a simple count as in FIG. 4.

The term "tonal importance mapping" is used herein to denote any measure of the importance, significance or saliency of the noise in each tonal value, where the tonal value refers to the tones in the original scene, for example using a radiance measure or other value indicative of scene brightness in a particular part of the spectrum.

But there will also be some regions where the noise will be less noticeable because it is masked by high frequency content, for example, a region of blue sky that is seen through the leaves or branches of a tree. Texture has a similar masking effect. Radiance values in such regions will be weighted by the processor 10 to diminish their importance when their occurrence is being counted. Ideally it is the perceptual effect of the noise on the final image quality that matters.

The selected exposure pattern 40 will therefore result in an image having less noticeable noise to a viewer of the image, with noise ramp steps 42 being positioned at less important image intensities, as defined by the tonal importance mapping 36.

Therefore, the invention can combine the noise prediction for a pattern of exposures and a tonal importance mapping incorporating information on the visually important aspects of the scene to determine a more optimal pattern of exposures.

Figure 8:
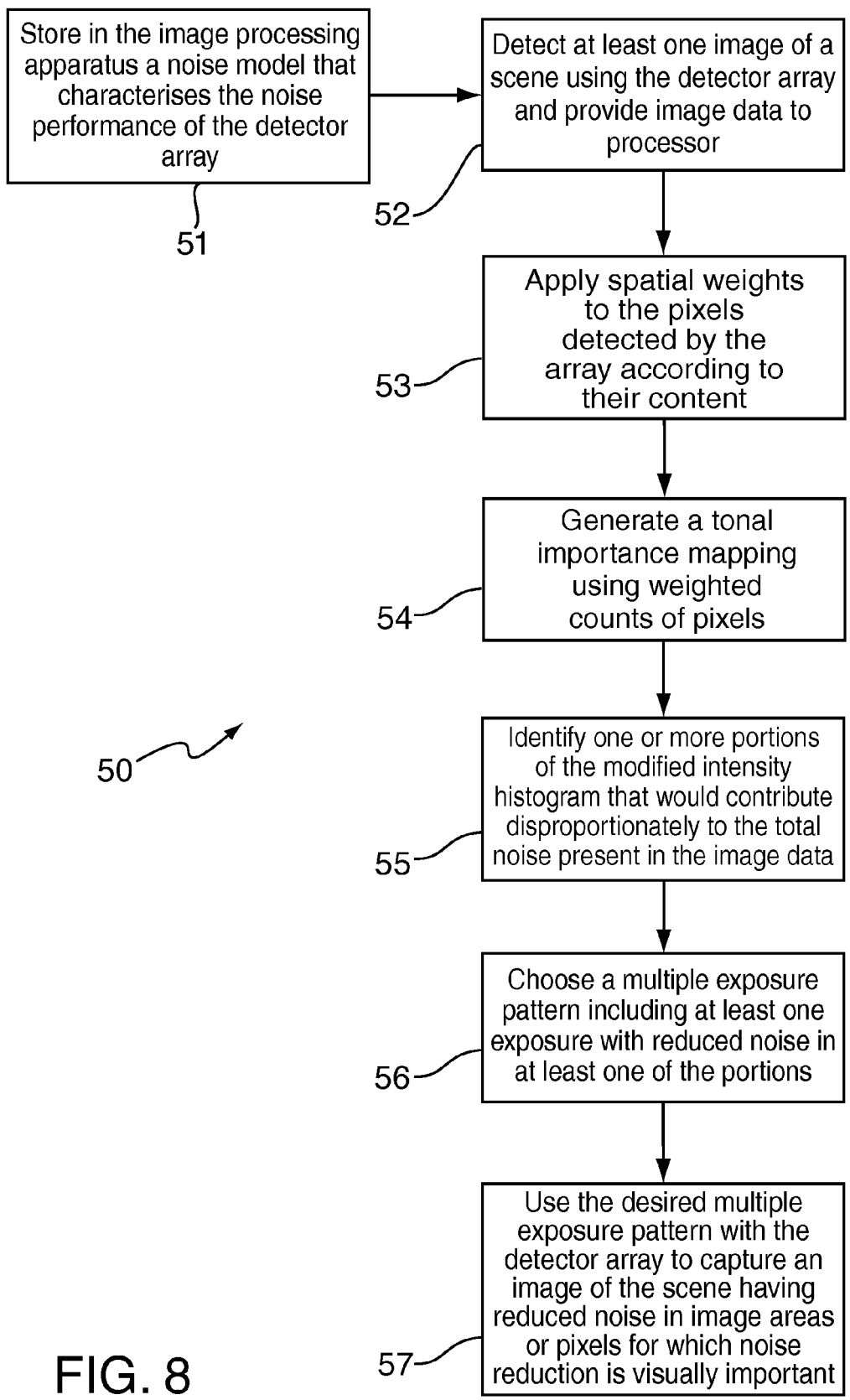
FIG. 8 is a flowchart illustrating the main steps of the invention when using an electronic image capture system to capture an image of a scene.

In summary, as described by the flow chart 50 of FIG. 8, the noise performance of at least the detector array 8 is characterised, and then stored 51 in the memory 14 of the image processing apparatus 10. The memory 14 holds information characterising the signal-to-noise performance characteristics of the detector array 8 over a plurality of exposure settings 21 of the array within the saturation limits 23 of the image capture pixels 9. The image processing apparatus 10 is arranged to receive 52 from the detector array 8 signals 18 representative of at least one image 6 captured by the array 8. This includes the case where these images are from previous cycles of operation of the system described herein. In other words, this also covers an incremental application of the invention whereby one or more exposures are determined and then captured before repeating the cycle to make improved selections of further exposures.

The image processing apparatus 10 monitors an image to be captured by the array 8, and when an image is to be captured, the image detected by the detector array 8 is scanned in a single pass and a running count of the number of pixels found at each intensity value is kept. This is then used to construct 53, 54 a suitable tonal importance mapping 36, which is here the intensity histogram 24 modified to account for the relative visual importance of portions of the image. Because it will be the case that in general images do not contain random information, one or more portions of the intensity histogram that contribute disproportionately to the total noise present can then be identified 55 by the processor 10.

The tonal importance mapping 36 may then be combined with the noise prediction 25 for a plurality of different exposure patterns to determine 56 a pattern of exposures with the least predicted noise 34, 40. In this process, the calculated noise is assessed across the full range of intensity values, and the intensity histogram 24 or tonal importance mapping 36 is used to determine the pattern of exposures (gain, exposure time, aperture controls, range of radiances captured, etc.) that minimizes the noticeable degradation by noise of final image quality.

The desired multiple exposure pattern 34, 40 is then used 57 to capture a composite image of a scene having reduced noise in image areas or pixels for which noise reduction is important.

It should be noted that image data of the initial or monitored image used to form the intensity histogram 24, 26, may optionally be stored in memory and used again later as one exposure of the selected exposure pattern. This provides the advantage of not having to take that particular exposure again.

In this example, when the intensity histogram 24 or tonal importance mapping 36 is combined with the noise plot 25 for a pattern of exposures 21, the processor 10 generates a metric indicating how well the important radiances in the scene have been captured. The use of a metric with the pattern of exposures allows an optimisation based approach or search to find the best pattern of exposures 34, 40 for reducing the noticeable noise.

Noise reduction in the downstream image processing pipeline may still be used. By estimating the spatial regions where noise reduction will be most effective, usually in regions of low detail, and by reducing the spatial weights of the pixels in those regions, the noise contribution from these regions can be reduced or disregarded when identifying portions of disproportionate noise or when estimating the noise performance of a pattern of exposures.

For example, the regions where noise is most noticeable are sometimes those where it is most easy to detect. Simple noise reduction assumes that high luminance differences correspond to image features (edges) and low luminance differences correspond to noise. Conventional noise reduction can work when these assumptions hold, and so it may not be necessary in such regions to reduce the noise solely using the invention described above.

Tone-mapping techniques such as retinex provide a means of visualizing genuinely higher dynamic range images on display devices without the dynamic range required to display the original image. This uses a spatially varying tone-mapping that can boost the details in shadows whilst attenuating details in the highlights. These techniques exploit the human visual systems characteristic of being more sensitive to contrasts in irradiance/luminance than absolute differences.

Without genuine dynamic range having low noise, the tone-mapping will create disturbing artefacts by boosting noise in the shadows. Therefore, the invention can be used to improve the performance of retinex techniques by reducing noise in regions where noise will be boosted.

In the regions where tone-mapping artefacts are likely to occur because noise is likely to be boosted in those regions, the corresponding pixels can be weighted to increase the count in the intensity histogram of the radiance values in such regions.

If more than one image is captured as a preliminary or monitored image at least one of the images may be strobe or flash illuminated to provide an estimate of both the intensities of the scene in available light and the relative intensities with strobe illumination. Together the available light and strobe images can allow exposure patterns to be determined with available light, strobe or mixtures of each.

As explained above, an electronic image capture system that captures the scene radiances by combining multiple exposures will follow a characteristic curve 25 plotting noise against radiance. This curve will have distinct steps 27 in noise. Different exposures 21 therefore have different noise characteristics. The position of these noise steps is determined by the patterns of exposures and the sensitivity of the colour channel. There will be a sudden change in the predicted noise when the set of exposures measuring the radiance value changes abruptly.

The invention ensures that noise steps 27 are correctly placed to minimise any sudden changes in the noise in the image, which can sometimes be visible by eye, for example as a noise contour in a smoothly varying region. Since a noise step 27 will occur over a limited range of radiance values, it is furthermore possible to weight radiance values near the noise steps that occur in regions where steps create artefacts as more important in the generation of histogram count. The invention can therefore be used to change the pattern of exposures to avoid placing noise steps in regions where these would create artefacts.

In this description, only the use of the green channel has been described. This may be adequate in some circumstances, but of course does not take into account the noise produced in the other colour channels of a colour image. In some applications, it may be desirable to have an intensity histogram per colour channel and then the score for a given exposure configuration will be the weighted sum of scores for each colour channel. This would allow the optimisation to balance the noise in different colour channels.

Another possibility would be to generate an intensity histogram for the luminance channel and calculate the noise in the luminance radiance value, as this is simply the weighted sum of the colour channels and so its variance can be derived. Selecting exposure patterns to reduce noise in a portion of the luminance range would involve selecting the exposures that would reduce noise levels across the colour channels so as to improve the appropriate portion of the luminance range. This is most easily done for relatively small image portions where the dominant colour is known.

Non-luminance based noise can then be removed by noise reduction in further processing by the processor.

An electronic image capture system combining multiple exposures according to the invention, by adapting the pattern of exposures to the scene, can therefore increase the range of scene radiance values it measures and reduce the noise in the measured radiance. The pattern of exposures used determines both the range of radiance values and the noise in the measured radiance.

The invention helps to reduce noise in areas where it degrades final visual image quality. Optimal image quality can be achieved for a reasonable cost in terms of total exposure time or number of exposures, or reduced cost for a given quality.

The invention also facilitate tone-mapping, which (owing to the increased number of levels which can be discriminated) requires high dynamic range with a noise performance in excess of a target display or print.

The invention can also make use of sensor-level approaches to capturing multiple exposures of a scene, which are now becoming available. For example, new CMOS sensors are available that can capture 6 Mega Pixels at 60 frames/second with hardware motion analysis to facilitate the combination of multiple exposures with reduced motion artefacts.

This invention addresses the problem of controlling and adapting an electronic image capture system to capture multiple exposures of a scene to obtain higher dynamic range images while minimizing the degradation of image quality by noise.

This approach described herein allows the noise associated with one radiance value to be traded against noise in other less important radiances.

Furthermore this invention can take into account the performance of other noise reduction techniques in the imaging pipeline.

The invention therefore provides a more convenient apparatus and method for capturing an electronic image, in which the captured image has reduced noise in selected pixels or areas.

It is to be recognized that various alterations, modifications, and/or additions may be introduced into the constructions and arrangements of parts described above without departing from the scope of the present invention, as defined by the appended claims.

In particular, it should be noted that the processor and memory may be incorporated into a single integrated circuit, or be distributed amongst discrete components. The instructions used by the processor may be software in stored memory, or hard wired as firmware. The skilled person will appreciate that various modifications can be made to the particular arrangement of hardware and software without departing from the scope of the invention as defined in the appended claims.

The invention therefore provides a convenient apparatus and method for capturing an electronic image with reduced noise.

The invention claimed is:

1. An electronic image capture system for capturing a reduced noise image of a scene, comprising a detector array and an image processing apparatus, the detector array being arranged to provide to the image processing apparatus data representing at least one image of a scene detected by the array, and the image processing apparatus storing a noise model that characterizes the noise performance of the image capture system, wherein the image processing apparatus is arranged to perform operations comprising:

based on the image data and the noise model, identifying one or more portions of the scene that are predicted to contribute disproportionately to visible noise in an image formed from said image data; and based on the identified portions of the scene and the noise model, determining an exposure pattern for the image capture system that is predicted to produce multiple exposures of the scene that are combinable to produce an image with a minimal predicted noise.

2. An electronic image capture system as claimed in claim 1, in which the noise model further characterizes noise performance of image processing the multiple exposures of the scene to produce the image with a minimal predicted noise.

3. An electronic image capture system as claimed in claim 1, in which the image processing apparatus is arranged to use the noise model and said image data to estimate visible noise for at least part of an image derived from a single exposure or combination of exposures, and to use said noise estimate to identify said portions of the scene.

4. An electronic image capture system as claimed in claim 1, in which the image processing apparatus is arranged to use the noise model and said image data to identify one or more suitable exposures to reduce said contribution to visible noise.

5. An electronic image capture system as claimed in claim 1, in which said portions of the scene are spatial portions defined at least partially on the basis of their spatial locations in the image data.

6. An electronic image capture system as claimed in claim 1, in which said portions of the scene are tonal portions defined at least partially on the basis of their tonal properties in the image data.

7. An electronic image capture system as claimed in claim 1, in which the image processing apparatus is arranged to apply a spatial weighting so that image data from selected spatial regions of the scene is relatively more important than image data from other spatial regions.

8. An electronic image capture system as claimed in claim 7, in which the image processing apparatus is arranged to identify one or more specific features in a detected image and to increase or reduce the weighting of image data originating from those features.

9. An electronic image capture system as claimed in claim 7, in which said spatial weightings are increased or reduced according to the uniformity of colour and/or tone in the image data from the corresponding spatial regions.

10. An electronic image capture system as claimed in claim 7, in which said spatial weightings are increased or reduced on the basis of face recognition rules applied by the image processing apparatus.

11. An electronic image capture system as claimed in claim 7, in which said spatial weightings are increased or reduced on the basis of visual saliency rules applied by the image processing apparatus.

12. An electronic image capture system as claimed in claim 7, in which said spatial weightings are increased or reduced on the basis of image processing rules applied by the image processing apparatus.

13. An electronic image capture system as claimed in 12, in which said image processing rules include one or more of tone mapping rules, colour processing rules, noise reduction rules, and image sharpening rules.

14. An electronic image capture system as claimed in claim 1, in which the image processing apparatus is arranged to generate from said image data a tonal importance mapping and then to use the noise model to identify from the tonal importance mapping one or more of said portions of disproportionate visible noise.

15. An electronic image capture system as claimed in claim 14, in which the tonal importance mapping associates a higher or lower importance value with a scene tone according to the number of pixels and/or spatial weightings of pixels in said image data having a corresponding image tone.

16. An electronic image capture system as claimed in claim 1, in which the image processing apparatus is constrained to select said selected exposure pattern within a cost metric.

17. An electronic image capture system as claimed in claim 16, in which said cost metric includes at least one of a measure of total exposure time, a measure of available electrical power, a measure of memory capacity, and a measure of the rate at which the electronic image capture system may capture images.

18. An electronic image capture system as claimed in claim 1, in which the image processing apparatus is constrained to select said selected exposure pattern so that this may be completed within a variable time window.

19. An electronic image capture system as claimed in claim 18, in which the variable time window is selected by the image processing apparatus according to at least one of a plurality of pre-determined exposure criteria.

20. An electronic image capture system as claimed in claim 19, in which said exposure criteria include a minimum and a maximum allowable total exposure time.

21. An electronic image capture system as claimed in claim 1, in which the image processing apparatus is arranged to capture, re-scale and combine said image data and image data from said selected exposure pattern to produce the reduced noise image.

22. A method of choosing multiple exposures for capturing an image of a scene with reduced noise, comprising:
    providing to an image processing apparatus image data representative of a scene;
    based on the image data and a noise model that characterizes the noise performance of the image capture system, identifying one or more portions of the scene that are predicted to contribute disproportionately to the visible noise in said image formed from said image data; and
    based on the identified portions of the scene and the noise model, determining an exposure pattern for the image capture system that is predicted to produce multiple exposures of the scene that are combinable to produce an image with a minimal predicted noise.

23. A method of capturing a reduced noise image of a scene using an electronic image capture system including an image processing apparatus, the method comprising the steps of providing to the image processing apparatus image data representing at least one monitored image, and using the image processing apparatus to:
    i) generate from the image data a tonal importance mapping;
    ii) use the tonal importance mapping to identify one or more portions of the scene that would contribute disproportionately to the noise present in an image derived from said image data;
    iii) choose a multiple exposure pattern including at least one exposure to reduce the noise contribution from at least one of said portions; and
    iv) use said desired multiple exposure pattern to capture multiple images of said scene and combine said multiple images to produce the reduced noise image.

24. A method as claimed in claim 23, in which step ii) comprises storing in the image processing apparatus a noise model that characterizes the noise performance of the electronic image capture system, and then using the noise model and the tonal importance mapping to identify the one or more portions of the scene that would contribute disproportionately to the noise present in an image derived from said image data.

25. A method as claimed in claim 23, in which the electronic image capture system comprises a detector array, the method further comprising:
    detecting at least one monitored image of a scene using the detector array; and
    producing from said monitored image(s) said image data.

26. A method as claimed in claim 23, in which step ii) comprises the steps of determining from the tonal importance mapping the visible noise present in an image formed from said image data, and then identifying one or more portions of the tonal importance mapping that contribute disproportionately to said visible noise.

27. A method as claimed in claim 23, in which step iii) comprises the steps of predicting the noise contribution from said portions that would be present at different exposures of said scene, and then selecting a desired multiple exposure pattern including at least one exposure to reduce the noise contribution from at least one of said portions.

* * * * *

UNITED STATES PATENT AND TRADEMARK OFFICE
CERTIFICATE OF CORRECTION

| | |
|---|---|
| PATENT NO. | : 8,264,574 B2 |
| APPLICATION NO. | : 12/375805 |
| DATED | : September 11, 2012 |
| INVENTOR(S) | : David Grosvenor et al. |

Page 1 of 1

It is certified that error appears in the above-identified patent and that said Letters Patent is hereby corrected as shown below:

In column 13, line 5, in Claim 13, after "claimed in" insert -- claim --

Signed and Sealed this
Fifth Day of February, 2013

Teresa Stanek Rea
*Acting Director of the United States Patent and Trademark Office*